United States Patent
Hebert et al.

(10) Patent No.: US 7,520,328 B2
(45) Date of Patent: *Apr. 21, 2009

(54) COMPLETION APPARATUS AND METHODS FOR USE IN HYDROCARBON WELLS

(75) Inventors: John Emile Hebert, Houma, LA (US); Patrick John Seely, Houma, LA (US); Joseph Jude Boudreaux, Houma, LA (US); Thomas A. Dupré, Bourg, LA (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/026,387

(22) Filed: Feb. 5, 2008

(65) Prior Publication Data

US 2008/0121396 A1 May 29, 2008

Related U.S. Application Data

(63) Continuation of application No. 11/623,253, filed on Jan. 15, 2007, now Pat. No. 7,325,609, which is a continuation of application No. 11/009,685, filed on Dec. 10, 2004, now Pat. No. 7,163,057, which is a continuation of application No. 09/692,592, filed on Oct. 19, 2000, now Pat. No. 6,845,820.

(51) Int. Cl.
E21B 43/10 (2006.01)
(52) U.S. Cl. .................. 166/285; 166/207; 166/380
(58) Field of Classification Search .......... 166/285, 166/380, 207, 177.4, 242.8
See application file for complete search history.

(56) References Cited

U.S. PATENT DOCUMENTS

| 761,518 | A | 5/1904 | Lykken |
|---|---|---|---|
| 1,324,303 | A | 12/1919 | Carmichael |
| 1,545,039 | A | 7/1925 | Deavers |
| 1,561,418 | A | 11/1925 | Duda |
| 1,569,729 | A | 1/1926 | Duda |
| 1,597,212 | A | 8/1926 | Spengler |
| 1,930,825 | A | 10/1933 | Raymond |
| 2,383,214 | A | 8/1945 | Prout |
| 2,499,630 | A | 3/1950 | Clark |
| 2,627,891 | A | 2/1953 | Clark |
| 2,663,073 | A | 12/1953 | Bieber et al. |

(Continued)

FOREIGN PATENT DOCUMENTS

EP 0 961 007 1/1999

(Continued)

*Primary Examiner*—William P Neuder
(74) *Attorney, Agent, or Firm*—Patterson & Sheridan, LLP

(57) ABSTRACT

The present invention provides a cement shoe assembly for use on a string of tubulars in a well. In one aspect of the invention, the cement shoe assembly includes a housing having a lower portion with an enlarged inside diameter and a drillable cement shoe disposed therein. The shoe includes a weakened portion of material adjacent the enlarged inside diameter portion of the housing and ensures that as a cutting tool passes through the housing, all portions of the cement shoe are removed from the enlarged inside diameter portion, leaving a connection surface clear of debris for a subsequent tubular string. When a smaller tubular is expanded into the enclosed diameter portion of the housing, a connection is made therebetween without enlarging the outer diameter of the housing.

24 Claims, 3 Drawing Sheets

U.S. PATENT DOCUMENTS

| | | |
|---|---|---|
| 2,898,971 A | 8/1959 | Hempel |
| 3,087,546 A | 4/1963 | Woolley |
| 3,167,122 A | 1/1965 | Lang |
| 3,195,646 A | 7/1965 | Brown |
| 3,413,565 A | 11/1968 | Babany et al. |
| 3,467,180 A | 9/1969 | Pensotti |
| 3,759,281 A | 9/1973 | Falcuta |
| 3,818,734 A | 6/1974 | Bateman |
| 3,911,707 A | 10/1975 | Minakov et al. |
| 4,069,573 A | 1/1978 | Rogers, Jr. et al. |
| 4,127,168 A | 11/1978 | Hanson et al. |
| 4,159,564 A | 7/1979 | Cooper, Jr. |
| 4,288,082 A | 9/1981 | Setterberg, Jr. |
| 4,324,407 A | 4/1982 | Upham et al. |
| 4,413,682 A | 11/1983 | Callihan et al. |
| 4,429,620 A | 2/1984 | Burkhardt et al. |
| 4,531,581 A | 7/1985 | Pringle et al. |
| 4,588,030 A | 5/1986 | Blizzard |
| 4,669,541 A | 6/1987 | Bissonnette |
| 4,697,640 A | 10/1987 | Szarka |
| 4,708,202 A | 11/1987 | Sukup et al. |
| 4,848,469 A | 7/1989 | Baugh et al. |
| 5,271,472 A | 12/1993 | Leturno |
| 5,337,823 A | 8/1994 | Nobileau |
| 5,409,059 A | 4/1995 | McHardy |
| 5,435,400 A | 7/1995 | Smith |
| 5,472,057 A | 12/1995 | Winfree |
| 5,560,426 A | 10/1996 | Trahan et al. |
| 5,685,369 A | 11/1997 | Ellis et al. |
| 5,794,702 A | 8/1998 | Nobileau |
| 5,901,787 A | 5/1999 | Boyle |
| 5,918,677 A | 7/1999 | Head |
| 6,021,850 A | 2/2000 | Wood et al. |
| 6,098,717 A | 8/2000 | Bailey et al. |
| 6,135,208 A | 10/2000 | Gano et al. |
| 6,302,205 B1 | 10/2001 | Ryll |
| 6,325,148 B1 | 12/2001 | Trahan et al. |
| 6,425,444 B1 | 7/2002 | Metcalfe et al. |
| 6,446,323 B1 | 9/2002 | Metcalfe et al. |
| 6,457,532 B1 | 10/2002 | Simpson |
| 6,527,049 B2 | 3/2003 | Metcalfe et al. |
| 6,543,552 B1 | 4/2003 | Metcalfe et al. |
| 6,631,769 B2 | 10/2003 | Cook et al. |
| 6,702,029 B2 | 3/2004 | Metcalfe et al. |
| 6,843,322 B2 | 1/2005 | Burtner et al. |
| 6,845,820 B1 * | 1/2005 | Hebert et al. ............... 166/285 |
| 7,163,057 B2 * | 1/2007 | Hebert et al. ............... 166/285 |
| 7,325,609 B2 * | 2/2008 | Hebert et al. ............... 166/285 |
| 2002/0060078 A1 | 5/2002 | Cook et al. |

FOREIGN PATENT DOCUMENTS

| | | |
|---|---|---|
| FR | 2 741 907 | 6/1997 |
| GB | 2 320 734 | 7/1998 |
| WO | WO 93/24728 | 12/1993 |
| WO | WO 99/19328 | 4/1999 |
| WO | WO 99/23354 | 5/1999 |
| WO | WO 99/35368 | 7/1999 |
| WO | WO 00/77431 | 12/2000 |
| WO | WO 01/04535 | 1/2001 |

* cited by examiner

COMPLETION APPARATUS AND METHODS FOR USE IN HYDROCARBON WELLS

CROSS-REFERENCE TO RELATED APPLICATIONS

This application is a continuation of U.S. patent application Ser. No. 11/623,253, filed Jan. 15, 2007, now U.S. Pat. No. 7,325,609, which is a continuation of U.S. patent application Ser. No. 11/009,685, filed Dec. 10, 2004, now U.S. Pat. No. 7,163,057, which is a continuation of U.S. patent application Ser. No. 09/692,592, filed Oct. 19, 2000, now U.S. Pat. No. 6,845,820. Each of the aforementioned related patent applications are herein incorporated in entirely by reference.

BACKGROUND OF THE INVENTION

1. Field of the Invention

The present invention provides an apparatus and methods for use in a hydrocarbon wellbore. More particularly the invention provides apparatus and methods for completing hydrocarbon wells. Still more particularly, the invention provides a cement shoe assembly for use in monobore wells.

2. Description of the Related Art

In the drilling of a hydrocarbon well, the borehole is physically lined with strings of pipe or tubulars (pipe or casing) to prevent the walls of the borehole from collapsing and to provide a reliable path for well production fluid, drilling mud and other fluids that are naturally present or that may be introduced into the well. Typically, after the well is drilled to a new depth, the drill bit and drill string are removed and a string of pipe is lowered into the well to a predetermined position whereby the top of the pipe is at about the same height as the bottom of the existing string of pipe (liner). Thereafter, with the new string of pipe held in place either temporarily or with some mechanical hanger, a column of cement is pumped into the pipe and forced to the bottom of the borehole where it flows out of the pipe and flows upwards into an annulus defined by the borehole and the pipe. The two principal functions of the cement between the pipe and the borehole are to restrict fluid movement between formations and to support the pipe.

To save time and money, apparatus to facilitate cementing are often lowered into the borehole along with a pipe to be cemented. Cementing apparatus typically includes a number of different components made up at the surface prior to run-in. These include a tapered nose portion located at the downhole end of the pipe to facilitate insertion thereof into the borehole. A check valve at least partially seals the end of the tubular and prevents entry of well fluid during run-in while permitting cement to subsequently flow outwards. The same valve or another valve or plug typically located in a baffle collar above the cementing tool prevents the cement from back flowing into the pipe. Components of the cementing apparatus are made of fiberglass, plastic, or other disposable material, that, like cement remaining in the pipe, can be drilled when the cementing is complete and the borehole is drilled to a new depth.

Historically, each section of pipe inserted to line a borehole was necessarily smaller in diameter than the section of pipe previously inserted. In this manner, a wellbore was formed of sequential strings of pipe of an ever-decreasing inner and outer diameter. Recently, methods and apparatus for expanding the diameter of pipe in a wellbore have advanced to the point where it has become commercially feasible to utilize the technology. This has led to the idea of monobore wells wherein through the expansion of tubulars in the wellbore, the wellbore remains at about the same diameter throughout its length. The advantages of the monobore well are obvious. The tubulars lining the borehole, and therefore the possible path for fluid in and out of the well remains consistent regardless of well depth. Additionally, tools and other devices can more easily be run into the well without regard for the smaller diameters of tubulars encountered on the way to the bottom of the wellbore.

In a monobore well, a first string of tubulars is inserted into the wellbore and cemented therein in a conventional manner. Thereafter, a string of tubulars having a smaller diameter is inserted into the wellbore as in prior art methods. However, after insertion into the wellbore the second string of tubulars is expanded to approximately the same inner and outer diameter as the first string. The strings can be connected together by use of a conventional hanger or, more typically, the smaller tubing is simply expanded into the interior of the larger diameter tubing thereabove in an area where the pipes overlap.

With the advent of monobore wells, certain problems have arisen. One problem relates to the expansion of the smaller tubular into the larger tubular to form the connection therebetween. Current methods of expanding tubulars in a wellbore to create a connection between tubulars requires the application of a radial force to the interior of the smaller tubular and expanding its diameter out until the larger tubular is itself pushed passed its elastic limits. The result is a connection having an outer diameter greater than the original outer diameter of the larger tubular. While the increase in the outer diameter is minimal in comparison to the overall diameter, there are instances where expanding the diameter of the larger pipe is difficult or impossible. For example, in the completion of a monobore well, the upper string of tubulars is preferably cemented into place before the next string of tubulars is lowered into the well and its diameter expanded. Because the annular area between the outside of the larger pipe and the borehole therearound is filled with cured cement, the diameter of the larger pipe cannot expand past its original shape.

Therefore, a need exists for a connection means between two tubulars in a wellbore whereby a smaller tubular can be expanded into a larger tubular without the need for expanding the outer diameter of the larger tubular during the expansion process. There is a further need for an apparatus for running a string of pipe into a wellbore including a cement shoe whereby, a another string of tubular can be subsequently expanded into the first string without increasing the outer diameter of the larger pipe. There is yet a further need for a cement shoe assembly which can be run into a well at the end of a string of tubulars and which can subsequently be drilled out leaving a portion of a cement shoe housing clear for connection to another smaller tubular by expansion means.

SUMMARY OF THE INVENTION

The present invention provides a cement shoe assembly for use on a string of tubulars in a well. In one aspect of the invention, the cement shoe assembly includes a housing having a lower portion with an enlarged inside diameter and a drillable cement shoe portion disposed therein. The shoe includes a weakened portion of material adjacent the enlarged inside diameter portion of the housing and ensures that as a cutting tool passes through the housing, all portions of the cement shoe are removed from the enlarged inside diameter portion, leaving a connection surface clear of debris for a subsequent tubular string. When a smaller tubular is expanded into the enclosed diameter portion of the housing, a connection is made therebetween without enlarging the outer diameter of the housing. In another aspect of the invention, the cement shoe includes a longitudinal bore providing a passageway for cement and other fluids with composite material therearound. Radial formations extend from the outer surface of the longitudinal bore to the inside surface of the enlarged inner diameter portion of the body, thereby assuring that as a drilling tool passes through the body, any material along the surface of the enlarged inside diameter portion of the housing will fall away, leaving the portion free of debris.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
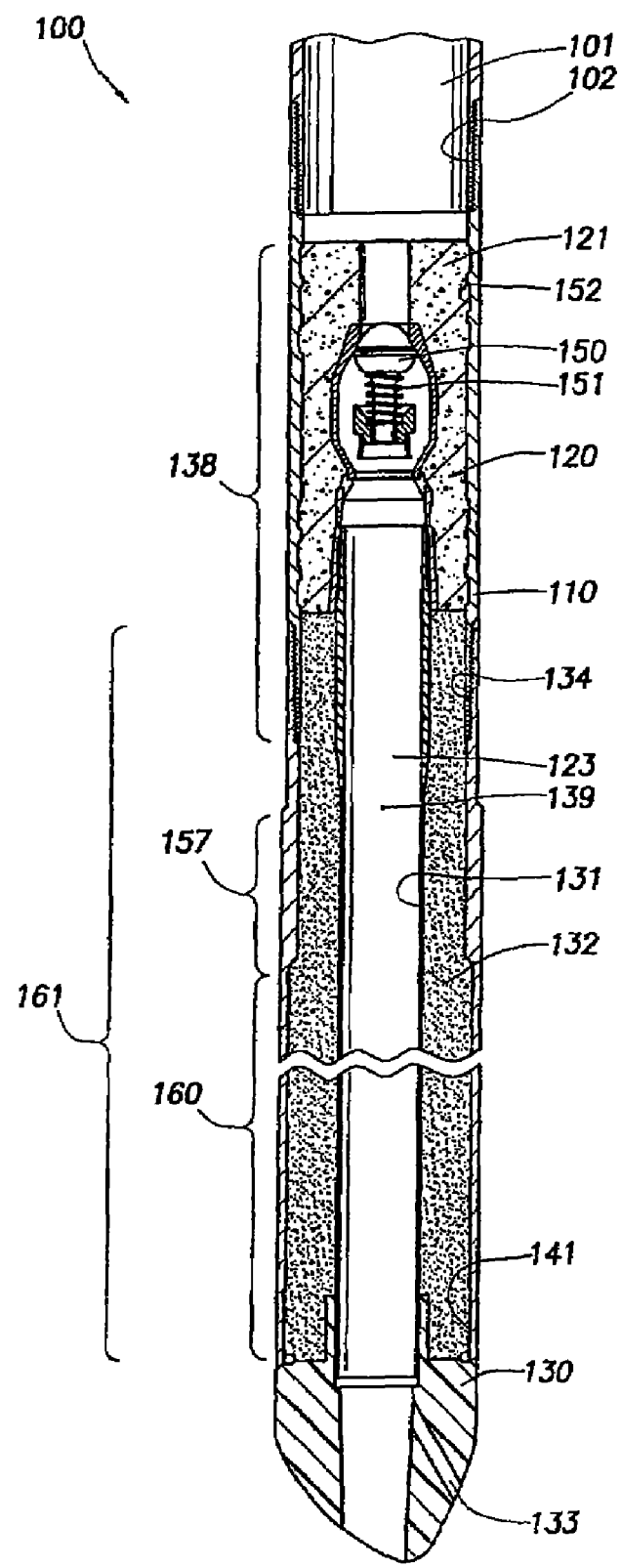
FIG. 1 is a side view in section of the cement shoe assembly of the present invention.

FIG. 1 is a section view of a cement shoe assembly 100 of the present invention. The assembly 100 is typically disposed at the end of a string of tubulars that is run into a well and cemented therein to isolate the wellbore from the formation therearound. The assembly 100 is preferably connected to a tubular 101 by a threaded connection 102 formed therebetween. The cement shoe assembly 100 includes a housing 110 and a drillable shoe portion 120 disposed within the housing. The drillable shoe portion 120 includes a longitudinal bore 123 extending through the center of the cement shoe and providing a fluid path for cement and well fluids. At an upper end, the bore 123 communicates with the tubular 101. Therebelow, a biased, one way valve 150 is disposed in the bore 123 permitting fluid to enter from the well surface but preventing well fluids from passing from the wellbore into tubular 101. In the embodiment shown, a spring 151 biases the valve 150 in a closed position. Adjacent valve 150, an annular area 121 defined between the bore and the housing 110 is filled with concrete to stabilize the bore 123. The housing 110 surrounding the concrete is equipped with upsets 152 to hold the concrete in place and prevent axial movement thereof. Lining the bore 123 between the valve 150 and a conical nose portion 130 is a tubular member 131. Adjacent the tubular member 131, an annular area 132 between the tubular member and the housing 110 is filled with sand or some other aggregate. The purpose of the sand is to support the tubular member 131 in the center of the bore 123 and to prevent migration of cement from the bore 123 to the well of the housing 110 through pressure equalization ports 139 formed in tubular member 131.

At a lower end of the assembly 100 is conical nose portion 130. The conical nose portion serves to direct fluid into and out of the assembly 100. Additionally, the offset, conical shape of the nose portion 130 aids in run-in of the assembly by facilitating the passage of the assembly 100 through the borehole. The construction and the shape of nose portion 130 is illustrated in detail in FIG. 2, an enlarged, section view thereof. At an upper end 136 the nose portion fits into housing 110 and is attached thereto with a threaded connection 134. A central bore 143 of the nose portion 130 is aligned with longitudinal bore 123 of the shoe portion 120. The nose portion 130 also includes at least one side port 133 for the passage of cement from the longitudinal bore 123 to the borehole (not shown). The nose portion 130 is constructed of drillable material having wear resistant, drillable characteristics. Fiberglass or some other composite material is typically used to form the conical nose portion 130. Located at an outer edge of the nose portion 130, at a point where the nose portion meets the edge of the housing 110, is a groove 171 formed around the perimeter nose portion. The groove 171 is constructed and arranged to ensure that the lower nose portion 135 falls away from the housing 110 as the shoe portion 120 and the upper nose portion 136 is drilled in the wellbore as will be described herein.

Figure 2:
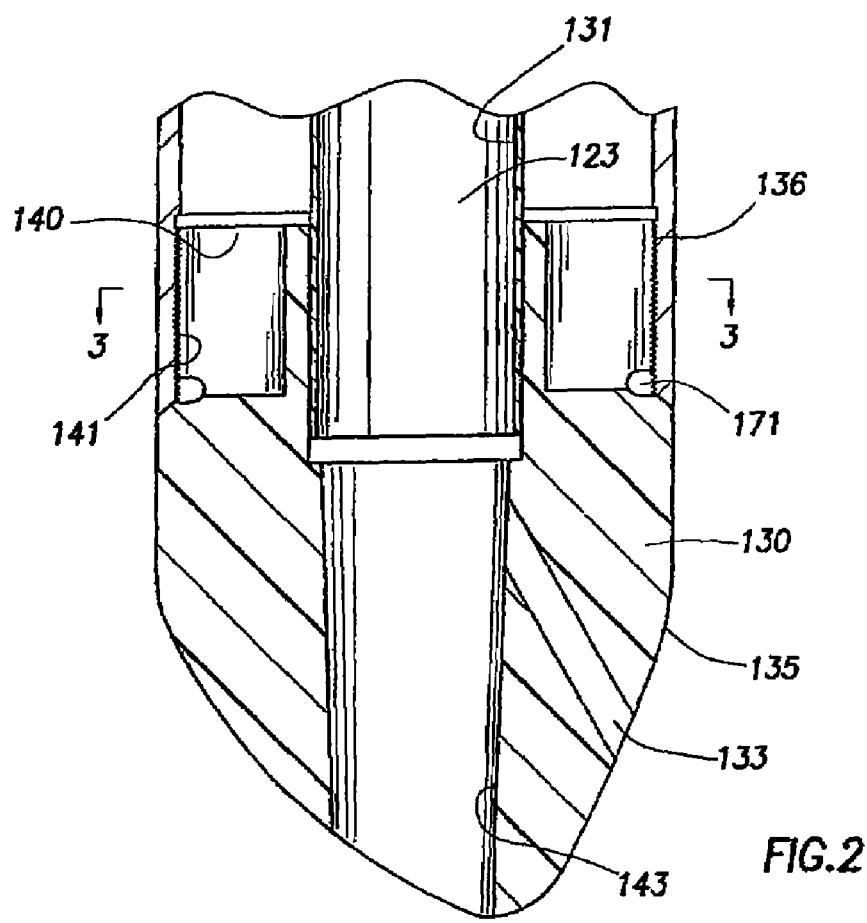
FIG. 2 is a more detailed section view of the conical nose portion of the cement shoe assembly shown in FIG. 1.
Figure 3:
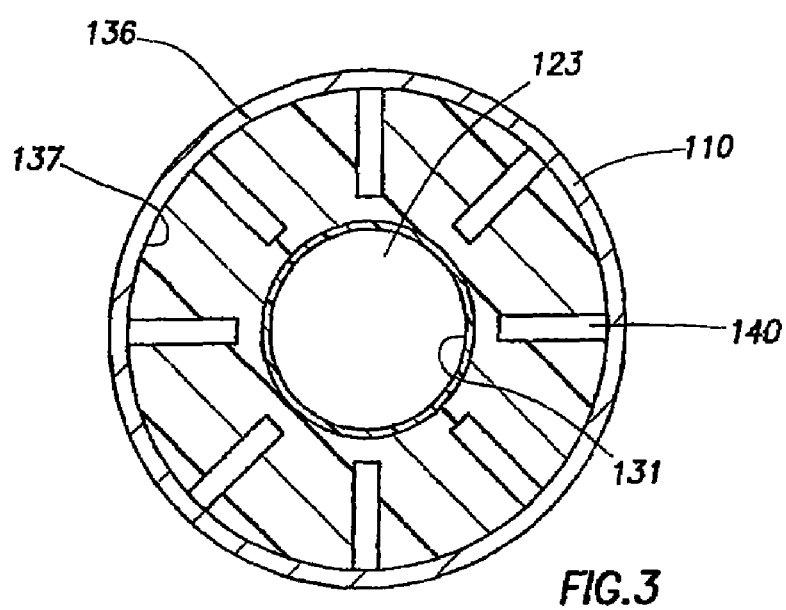
FIG. 3 is a downward, cross-sectional view of the cement shoe assembly of FIG. 1 taken through a line 3-3 of FIG. 2.

Also included in the upper portion 136 of the conical nose portion 130 are a plurality of radially extending formations 140 originating at an inner edge 137 of the housing 110 and extending inward to terminate adjacent the tubular member 131. In the preferred embodiment, the formations 140 are voids formed in the composite material of the conical nose portion. FIG. 3 is a section view of the nose portion of the assembly taken along a line 3-3 of FIG. 2. FIG. 2 illustrates the relative height of the formations 140 and FIG. 3 illustrates the width and length of each formation 140. The purpose of the formations is to ensure that the outermost portions of the upper nose portion 136 fall away from the housing 110 as the shoe portion is drilled as will be explained herein.

Figures 4, 5:
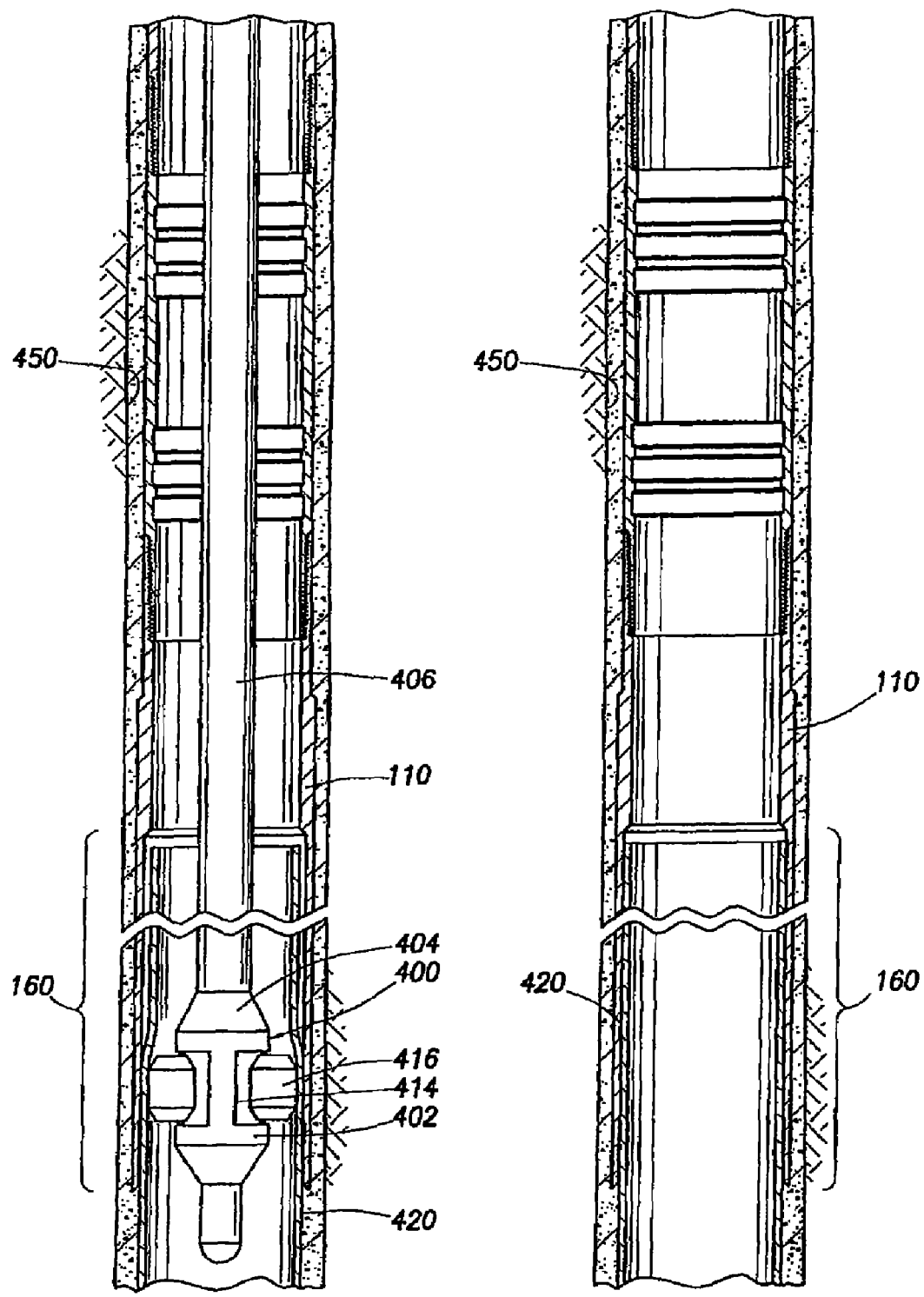
FIG. 4 is a section view of a wellbore showing the housing of the cement shoe assembly cemented in place and a second tubular therebelow being expanded into the housing with an expansion tool.
FIG. 5 is a section view of the wellbore of FIG. 4, showing a completed connection formed between the housing of the cement shoe assembly and the second tubular.

Visible specifically in FIGS. 1, 4 and 5, the outer housing 110 of the assembly is a two piece housing with a threaded connection 134 between an upper 138 and lower 161 portions. In the embodiment shown, the upper portion 138 of the housing 110 has approximately the same outer diameter as the tubular 101 thereabove. The lower portion 161 of the housing includes an area of increased wall thickness 157 terminating in an area of the housing 160 having an enlarged inner diameter. The enlarged inside diameter area 160 is designed to provide a non-expanding mating surface for the upper portion of a tubular when the tubular is expanded into housing 110 as described herein.

In the completion of a well utilizing the cement shoe assembly of the present invention, an initial or subsequent section of borehole is drilled to a predetermined depth in the earth. Thereafter, a string of tubular is run into the new borehole with the cement shoe assembly 100 disposed at a lower end thereof. With the tubular string fixed in the wellbore and the cement shoe assembly 100 near the bottom of the borehole, cement is injected into the wellbore with the tubular string providing a fluid path for the cement. When the flowing cement reaches cement shoe assembly 100, it passes through one-way valve 150, through longitudinal bore 123 and exits the central bore 143 of the conical nose portion 130 as well as side ports 133. Upon reaching the bottom of the borehole, the cement is then forced up an annular area formed between the outer surface of the housing 110 and the borehole therearound (not shown). A column of fluid is then pumped into the tubular string after the cement to ensure that most of the cement exits the lower end of the cement shoe assembly 100. Thereafter, the cement is allowed to cure and subsequently, a drilling tool is run into the wellbore inside of the tubular string and the drillable shoe portion 120 and conical nose portion 130 are drilled up and destroyed, leaving only the housing 110. Thereafter, a new length of borehole is drilled and subsequently lined with another tubular string. The upper portion of the new string of tubular is subsequently expanded into the enlarged inside diameter portion 160 of housing 110 of the cement shoe assembly 100.

In a conventional cement shoe, the inside diameter of the cement shoe housing is only slightly larger than the outer diameter of a drilling tool used to drill the drillable cement shoe portion 120. This ensures that the material making up the cement shoe is removed. In the present invention, as illustrated in the Figures, the housing 110 of the cement shoe assembly is not a uniform inside diameter but includes larger inside diameter area 160. As previously explained, the larger inside diameter area 160 permits the expansion of a tubular into the housing without expanding the outside diameter of the housing 110. In this manner a connection may be made between the housing and another piece of tubular, even when the housing is cemented into place in the wellbore and its outer diameter cannot be expanded.

In order to ensure that all portions of the shoe portion 120 and conical nose portion 130 fall free of housing 110 in the enlarged inside diameter area 160, the formations 140 in the upper portion of the conical nose portion are designed to remove all radial support for any material left between the drill and the wall of the housing 110 when the drilling tool passes through the housing 110. Considering FIG. 1, a drilling tool, when passing through the upper portion 138 of the housing 110, will contact, break-up and loosen all material and components in the upper portion 138 of the housing. Debris from the material and components is carried to the surface by circulating fluids. Likewise, as the drilling tool passes from the housing 110 to the conical portion 130 it will intersect groove 171 and the lower conical portion 135 will be dislodged from housing 110. However, as the cutting tool passes through the enlarged inside diameter portion 160 of housing 110, some material making up the upper portion 136 of the conical nose portion will not be directly contacted by the drilling tool. As is visible in FIG. 3, formations 140 remove any radial support of composite material which might remain in a ring-like shape after the drilling tool passes through the upper portion 136 of the conical nose portion 130.

As described above, after the drillable components and material making up the shoe portion 120 are drilled up, the larger inside diameter area 160 of the housing remains as a mating surface for the expansion of a tubular having a smaller diameter. FIG. 4 is a section view of a wellbore illustrating housing 110 cemented into place in a borehole 450 and a tubular 420 therebelow being expanded into the larger inside diameter area 160 of housing 110. Typically, after a new string of tubular is fixed in the wellbore, an expansion tool 400 will be run into the well on a run-in string of tubular 406 and used to enlarge the inner and outer diameter of the tubular string to the size of the tubular string thereabove. FIG. 4 illustrates one expansion tool 400 typically used to expand a tubular string in a "bottom-up" fashion.

The expansion tool 400 operates with pressurized fluid supplied through run-in string 406. The expansion tool 400 includes a body 402 which is hollow and generally tubular with a connector 404 for connection to the run-in string 406. The body 402 includes at least two recesses 414 to hold a respective roller 416. Each of the mutually identical rollers 416 is near-cylindrical and slightly barreled. Each of the rollers 416 is mounted by means of a bearing (not shown) at each end of the respective roller for rotation about a respective rotation axis which is parallel to the longitudinal axis of the expansion tool 400 and radially offset therefrom. The inner end of a piston (not shown) is exposed to the pressure of fluid within the hollow core of the tool 400 and the pistons serve to actuate or urge the rollers 416 against the inside wall of a tubular therearound. In FIG. 4, the expansion tool 400 is shown in an actuated position and is expanding the diameter of a tubular into a bore defined by the larger inside diameter area 160 of housing 110. Typically, the expansion tool 400 rotates as the rollers are actuated and the tool is urged upwards in the wellbore. In this manner, the expansion tool can be used to enlarge the diameter of a tubular circumferentially to a uniform size and to a predetermined length in the wellbore. FIG. 5 illustrates a completed connection between the enlarged diameter area 160 of housing 110 and the tubular 420. As illustrated, the inside and outside diameter of the tubular 420 has been increased as the tubular is expanded past its elastic limits. However, the enlarged inside diameter area 160 of housing 110 has not expanded in diameter. In this manner, the tubular 420 is successfully affixed to the housing 110 without expanding the diameter of the housing. Additionally, the inside diameter of the housing 110 and the tubular 420 are substantially the same.

The connection arrangement disclosed herein and shown in FIGS. 4 and 5 is not limited to use with a cement shoe assembly and can be used to join tubulars at any location downhole when a connection between tubulars is desired without expanding the outer diameter of the larger tubular. For example, the apparatus and method can be utilized anytime cement, formations or any other material surrounding the outer tubular make it difficult or impossible to use an expansion technique requiring the expansion of the larger tubular. Additionally, the methods and apparatus disclosed and claimed herein can be used in any well and are not necessarily limited to use in a hydrocarbon well.

While the foregoing is directed to the preferred embodiment of the present invention, other and further embodiments of the invention may be devised without departing from the basic scope thereof, and the scope thereof is determined by the claims that follow.

The invention claimed is:

1. A shoe assembly, comprising:
   a housing having a wall with longitudinal first and second sections, wherein the wall at the first section has a greater thickness than at the second section to define an internal recess along the second section;
   a valve member configured to selectively permit fluid passage through the shoe assembly; and
   a nose member disposed in the housing such that at least a portion of the nose member is positioned adjacent the internal recess.

2. The assembly of claim 1, further comprising an isolation member disposed in the housing such that an annular space is formed between the isolation member and a portion of the second section.

3. The assembly of claim 2, wherein the annular space extends at least substantially the length of the internal recess.

4. The assembly of claim 2, wherein the annular space is filled with an aggregate.

5. The assembly of claim 2, wherein the isolation member prevents migration of cement from a bore defined by the isolation member to the internal recess.

6. The assembly of claim 1, wherein an outer diameter of the tubular housing is uniform.

7. The assembly of claim 1, wherein the second section is proximate a lower end of the housing.

8. A method of forming a connection between tubulars, comprising:
- disposing a first tubular in the wellbore, the first tubular having an isolation member disposed therein;
- disposing a second tubular into the first tubular after removing the isolation member, wherein a portion of the second tubular overlaps an internal recess of the first tubular; and
- expanding a portion of the second tubular into the internal recess.

9. The method of claim 8, wherein the first tubular includes a tubular wall with longitudinal first and second sections and wherein the wall at the first section has a greater thickness than at the second section to define the internal recess along the second section.

10. The method of claim 8, further comprising filling an annular area formed between the isolation member and the internal recess with an aggregate.

11. The method of claim 9, wherein the first tubular has a uniform outer diameter.

12. A shoe assembly, comprising:
- a tubular housing having a tubular wall with longitudinal first and second sections, wherein the wall at the first section has a greater thickness than at the second section to define an internal recess along the second section;
- a valve member configured to selectively permit fluid passage through the shoe assembly; and
- an isolation member disposed in the housing such that a sealed area is formed between the isolation member and the tubular housing.

13. The shoe assembly of claim 12, wherein the isolation member is drillable to permit removal of the isolation member from the second section that remains.

14. The shoe assembly of claim 12, further comprising a nose member extending from where the second section terminates to facilitate insertion of the shoe assembly in a borehole.

15. The shoe assembly of claim 12, wherein the sealed area is filled to prevent accumulation of unwanted material in the sealed area.

16. The shoe assembly of claim 12, wherein the tubular housing is cemented in the borehole.

17. The shoe assembly of claim 12, wherein the first and second sections are surrounded by cement.

18. The shoe assembly of claim 12, wherein the sealed area is filled with an aggregate.

19. The shoe assembly of claim 12, wherein the second section is proximate a lower end of the housing.

20. A shoe assembly, comprising:
- a housing having an enlarged inner diameter portion proximate an end thereof;
- a valve member configured to selectively permit fluid passage through the shoe assembly; and
- a nose member disposed in the housing such that at least a portion of the nose member is positioned adjacent the enlarged inner diameter portion.

21. The assembly of claim 20, further comprising an isolation member disposed in the housing such that an annular space is formed between the isolation member and a portion of the housing.

22. The assembly of claim 21, wherein the annular space extends at least substantially the length of the enlarged inner diameter portion.

23. A method of forming a tubular assembly for disposal proximate an end of a well tubular string, comprising:
- providing an outer tube and an inner tube disposed concentrically within the outer tube, wherein the outer tube includes an enlarged inner diameter portion proximate an end thereof; and
- filling an annular area between the outer tube and the inner tube with an aggregate during assembly of the inner tube with the outer tube and prior to lowering the tubular assembly into a well.

24. A tubular assembly for disposal proximate an end of a well tubular string, comprising:
- an outer tube having an enlarged inner diameter portion proximate an end thereof;
- an inner tube disposed concentrically within the outer tube, wherein the inner tube is coupled to the outer tube to hold the inner tube at least temporarily in place;
- an aggregate filled annular area between the outer tube and the inner tube; and
- a nose member directly coupled to the outer tube, wherein the nose member facilitates insertion of the tubular assembly into a well.

* * * * *